United States Patent
Jeong

(10) Patent No.: US 9,048,657 B2
(45) Date of Patent: Jun. 2, 2015

(54) CONTROL CIRCUIT FOR ELECTRIC POWER CIRCUIT SWITCH

(71) Applicant: LSIS CO., LTD., Anyang-si, Gyeonggi-do (KR)

(72) Inventor: Young Woo Jeong, Cheongju-si (KR)

(73) Assignee: LSIS Co., Ltd., Anyang-Si, Gyeonggi-Do (KR)

(*) Notice: Subject to any disclaimer, the term of this patent is extended or adjusted under 35 U.S.C. 154(b) by 0 days.

(21) Appl. No.: 14/171,609

(22) Filed: Feb. 3, 2014

(65) Prior Publication Data

US 2014/0268461 A1 Sep. 18, 2014

(30) Foreign Application Priority Data

Mar. 13, 2013 (KR) .................. 10-2013-0026933

(51) Int. Cl.
 *H02H 3/08* (2006.01)
 *H02H 3/44* (2006.01)
 *H02H 3/46* (2006.01)

(52) U.S. Cl.
 CPC . *H02H 3/08* (2013.01); *H02H 3/44* (2013.01); *H02H 3/46* (2013.01)

(58) Field of Classification Search
 USPC .......................................................... 361/87
 See application file for complete search history.

(56) References Cited

U.S. PATENT DOCUMENTS

| | | | | |
|---|---|---|---|---|
| 4,868,704 A | * | 9/1989 | Cavero ........................... | 361/180 |
| 5,172,329 A | * | 12/1992 | Rahman et al. ............... | 700/293 |
| 5,224,011 A | * | 6/1993 | Yalla et al. .................... | 361/93.2 |
| 5,537,327 A | * | 7/1996 | Snow et al. ................... | 700/293 |
| 5,822,165 A | * | 10/1998 | Moran ........................... | 361/78 |
| 8,744,637 B1 | * | 6/2014 | Maragal ........................ | 700/294 |
| 2004/0172207 A1 | * | 9/2004 | Hancock et al. ............... | 702/60 |
| 2005/0171647 A1 | * | 8/2005 | Kunsman et al. ............. | 700/293 |
| 2010/0097733 A1 | * | 4/2010 | E. .................................. | 361/42 |
| 2014/0198420 A1 | * | 7/2014 | Kojovic ......................... | 361/86 |
| 2014/0268461 A1 | * | 9/2014 | Jeong ............................. | 361/87 |

FOREIGN PATENT DOCUMENTS

| | | |
|---|---|---|
| JP | 62-260517 | 11/1987 |
| JP | 2002-186167 | 6/2002 |
| JP | 2007-014052 | 1/2007 |

OTHER PUBLICATIONS

Japan Patent Office Application Serial No. 2014-035196, Office Action dated Feb. 13, 2015, 2 pages.

* cited by examiner

*Primary Examiner* — Ronald W Leja

(74) *Attorney, Agent, or Firm* — Lee, Hong, Degerman, Kang & Waimey

(57) ABSTRACT

A control circuit for an electric power circuit switch includes: a sampling/hold circuit section configured to sample a period of a detection signal of a current of an electric power system and provide a sampled signal; a discrete Fourier transforming (abbreviated as DFT) circuit section perform DFT on the one-period sampled signal to provide a magnitude and a phase of a frequency component of the current of the electric power system; a differentiator configured to differentiate the detection signal to provide a rate of change of the current over time; and a controller to determine whether to perform trip controlling according to the magnitude of the frequency component of the current from the DFT circuit section or the rate of change from the differentiator on the basis of the rate of change of the current and the reference rate of change.

4 Claims, 2 Drawing Sheets

CONTROL CIRCUIT FOR ELECTRIC POWER CIRCUIT SWITCH

CROSS-REFERENCE TO RELATED APPLICATION

Pursuant to 35 U.S.C. §119(a), this application claims the benefit of earlier filing date and right of priority to Korean Application No. 10-2013-0026933, filed on Mar. 13, 2013, the contents of which is incorporated by reference herein in its entirety.

BACKGROUND OF THE INVENTION

1. Field of the Invention

The present disclosure relates to a control circuit for an electric power circuit switch, and particularly, to a control circuit for an electric power circuit switch capable of reducing a control speed of a switch in response to detection of a current flowing in the electric power circuits.

2. Background of the Invention

An electric power system, which generates and consumes electric power, includes an electric power transmission network, substation, and an electric power distribution network between a power plant and consumers.

Various devices are applied to respective components of the electric power system to protect the system in the event of a fault current, and among the devices, a protective relay senses an overcurrent or a short-circuit current exceeding a normal range to drive a circuit breaker to separate a failure section from the electric power system.

When a short-circuit, or the like, occurs, very low impedance as low as line impedance of a fault spot is formed in a generator or a bus line, and thus, a very large short-circuit current flows in the electric power system (hereinafter, referred to as a 'system'), which results in that the system suffers various problems such as a voltage drop, a frequency reduction, a thermal and mechanical stress of an electric power device, and the like, and becomes unstable. Thus, the fault section needs to be quickly separated from the electric power system in terms of stability.

In a digital protective relay, discrete Fourier transforming (abbreviated as DFT hereinafter) is commonly used to determine a fault (e.g., a fault current, such as a short-circuit, generated in a system circuit) in current of a system.

In this method, a sampled current signal flowing in a system undergoes discrete Fourier Transforming to extract a magnitude and a phase of only a frequency component of the current of the system to determine whether a fault has occurred.

Namely, only a magnitude of a frequency component is extracted from a current signal generated to have a large magnitude in the event of a fault current, and whether a current is a fault current or it has a simple surge waveform may be determined on the basis of a corresponding signal waveform.

This method is advantageous in that it is simply implemented and resistant to noise, but in case of an alternating current (AC) signal having a form such as a sine wave, input data of one period is required, so a detection time equal to or more than one period is required. Thus, in a case in which a very large fault current is generated, a load device and an electric power system are exposed to the fault current for an unnecessarily long period of time, causing a great deal of damage.

SUMMARY OF THE INVENTION

Therefore, an aspect of this disclosure is to provide a control circuit for an electric power circuit switch capable of determining whether a fault current has occurred by using a DFT in a current region in which whether a fault current is has occurred is not required to be determined quickly (or at a high speed), and determining whether a fault current has occurred quickly by using a rate of change (a differentiated value) of a current of an electric power system in a large current region, thus breaking an electric power circuit.

The aspect of this disclosure can be achieved by providing a control circuit for an electric power circuit switch, the control circuit comprising:

a sampling/hold circuit section configured to sample a period of a detection signal of a current of an electric power system and provide a sampled signal;

a discrete Fourier transforming circuit section connected to the sampling/hold circuit section and perform a discrete Fourier transforming on the one-period sampled signal of the current of the electric power system provided from the sampling/hold circuit section to provide a magnitude and a phase of a frequency component of the current of the electric power system;

a differentiator configured to differentiate the detection signal of the current of the electric power system to provide a rate of change of the current of the electric power system over time; and a controller connected to the discrete Fourier transforming circuit section and the differentiator and configured to determine whether to perform trip controlling according to the magnitude of the frequency component of the current of the electric power system from the discrete Fourier transforming circuit section or the rate of change from the differentiator on the basis of the rate of change of the current of the electric power system and the reference rate of change.

According to a preferred another aspect of this disclosure, when a value of the current of the electric power system according to the detection signal of the current of the electric power system exceeds a rated current value, the controller is configured to compare the rate of change from the differentiator with a predetermined reference rate of change, and when the rate of change is smaller than the reference rate of change, the controller determines whether to perform trip controlling on the basis of the magnitude of the frequency component of the current of the electric power system provided from the discrete Fourier transforming circuit section, and when the rate of change is equal to or greater than the reference rate of change, the controller determines whether to perform trip controlling on the basis of the rate of change from the differentiator.

According to still another preferred aspect of this disclosure, the control circuit according to this disclosure further comprises a current transformer configured to provide the detection signal of the current of the electric power system and connected to the sampling/hold circuit section, the differentiator, and the controller.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this disclosure, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
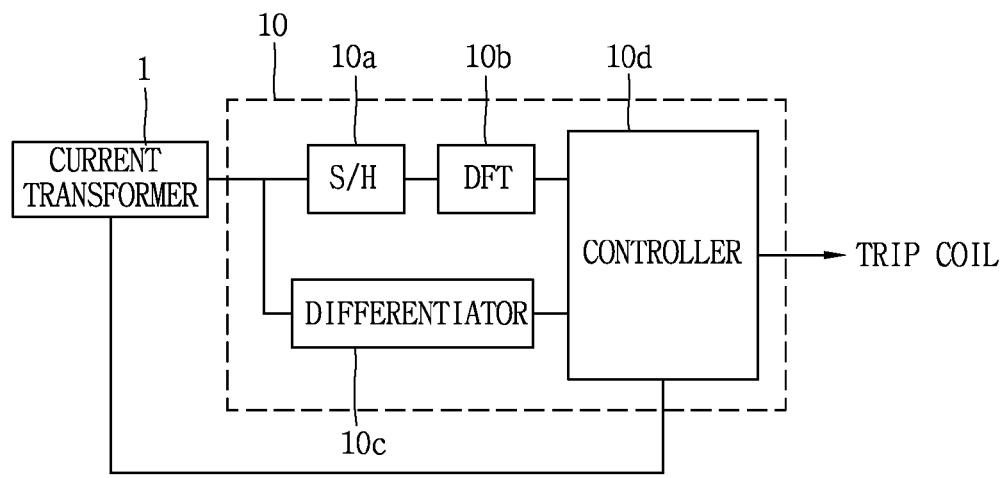
FIG. 1 is a functional block diagram illustrating a configuration of a control circuit for an electric power circuit switch according to a preferred embodiment of the present invention.

Referring to FIG. 1 as a functional block diagram illustrating a configuration of a control circuit for an electric power circuit switch according to a preferred embodiment of the present invention, a control circuit 10 for an electric power circuit switch according to a preferred embodiment of the present invention includes a sampling/hold circuit section (in other words sampling and hold circuit section, can be abbreviated as S/H) 10a, a Discrete Fourier Transforming (abbreviated as DFT hereinafter) circuit section 10b, a differentiator 10c, and a controller 10d.

The sampling/hold circuit section 10a samples one period of a detection signal of an electric current (abbreviated as current hereinafter) of an electric power system and provides the same. Here, the detection signal of the current of the electric power system may be detected by a current transformer 1 of FIG. 1 and provided.

The DFT circuit section 10b is a circuit section which is connected to an output terminal of the sampling/hold circuit section 10a and performs DFT on the sampled signal of one period of the detection signal of the current of the electric power system provided from the sampling/hold circuit section 10a to provide a magnitude and a phase of a frequency component of the current of the electric power system.

The differentiator 10c differentiates the detection signal of the current of the electric power system to provide a rate of change of the current of the electric power system over time.

The controller 10d is connected to the DFT circuit section 10b and the differentiator 10c. On the basis of the rate of change of the current of the electric power system and a reference rate of change, the controller 10d determines trip (TRIP) controlling according to the magnitude of the frequency component of the current of the electric power system from the DFT circuit section 10b or the rate of change from the differentiator 10c. Here, trip controlling may refer to controlling a switching device such as a circuit breaker as a control target to be controlled by the control circuit 10 for an electric power circuit switch according to a preferred embodiment of the present invention to move to a position in which an electric power system circuit is broken. A trip control signal of the controller 10d for trip controlling is output from the controller 10d, as a magnetization control signal for magnetizing a magnetic coil, namely, a trip coil, forming a major part of an electro-magnetic trip mechanism of the circuit breaker (not shown).

In particular, when a value of the current of the electric power system according to the detection signal of the current of the electric power system exceeds a rated current value (refer to a current value of a waveform S4 in FIG. 2), the controller 10d compares the rate of change from the differentiator 10c with a predetermined reference rate of change. When the rate of change from the differentiator 10c is smaller than the reference rate of change, the controller 10d determines whether to perform trip controlling on the basis of the magnitude of the frequency component of the current of the electric power system provided from the DFT circuit section 10b. When the rate of change from the differentiator 10c is equal to or greater than the reference rate of change, the controller 10d determines to perform trip controlling on the basis of the rate of change from the differentiator 10c.

The control circuit 10 for an electric power circuit switch according to a preferred embodiment of the present invention may further include the current transformer 1 connected to the sampling/hold circuit section 10a, the differentiator 10c, and the controller 10d to provide the detection signal of the current of the electric power system.

The operation of the control circuit 10 for an electric power circuit switch according to a preferred embodiment of the present invention as described above will be described with reference to FIGS. 1 to 3.

Figure 2:
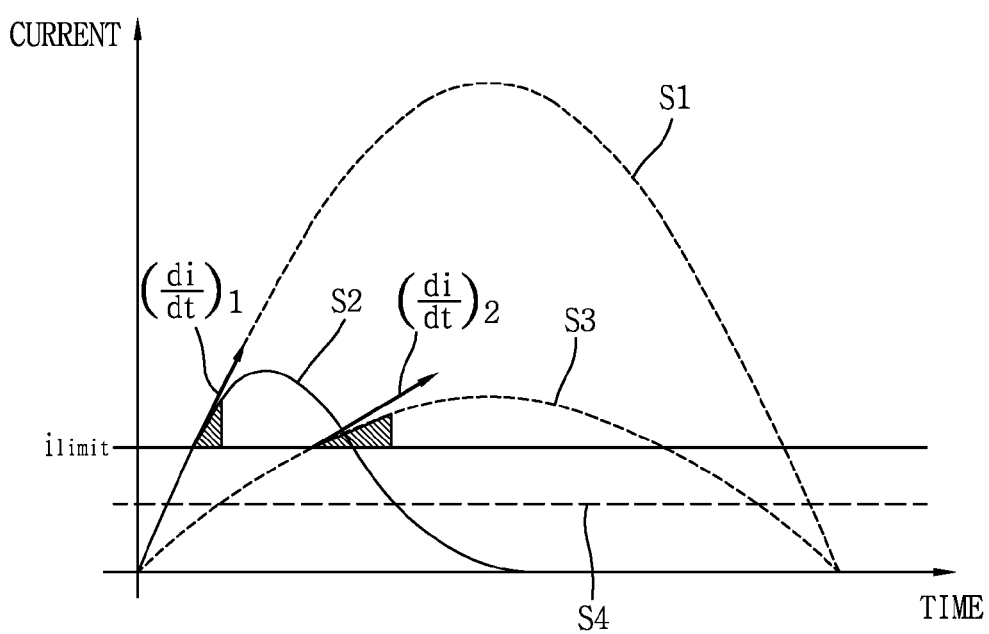
FIG. 2 is a waveform view showing differences in waveforms and rate of changes of two electric currents of the electric power system.

Referring to FIG. 2, S1 indicates a waveform of a fault current, like a short-circuit current, as large as a few to tens times a rated current S4, "S2" indicates a waveform of a fault current relatively as much as a few times the rated current S4, "S3" indicates a waveform of a fault current which is within a few times the rated current S4 and has a small rate of change, "S4" indicates a waveform denoting a value of the rated current S4, and "$i_{limit}$" indicates an upper limit reference current value.

The controller 10d, the sampling/hold circuit section 10a, and the differentiator 10c receive a detection signal of the current of the electric power system from the current transformer 1.

First, an operation of the control circuit 10 for an electric power circuit switch according to a preferred embodiment of the present invention in a case in which the detection signal of the current of the electric power system provided from the current transformer 1 has the waveform of S3 will be described.

Figure 3:
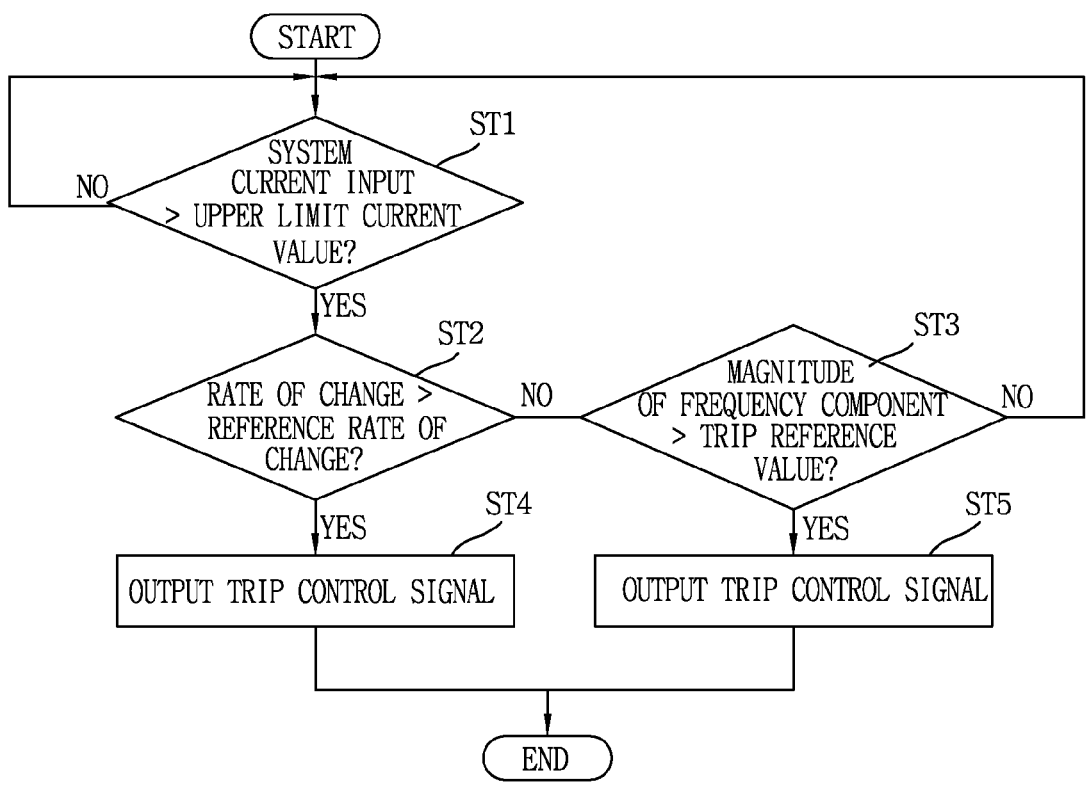
FIG. 3 is a flow chart illustrating a method for controlling a control circuit for an electric power circuit switch according to a preferred embodiment of the present invention.

Referring to FIG. 3, in operation ST1, the controller 10d compares a current value of the detection signal of the current of the electric power system provided from the current transformer 1 with the upper limit reference current value $i_{limit}$ which has been previously set and stored, according to a processing program to check whether the former is greater than or equal to the latter.

According to the comparison result in operation ST1, when the current value of the detection signal of the current of the electric power system is greater than or equal to the upper limit reference current value $i_{limit}$ which has been previously set and stored, the controller 10d performs operation ST2 according to the processing program, and when the current value of the detection signal of the current of the electric power system is smaller than the upper limit reference current value ilimit which has been previously set and stored, the controller 10d performs operation ST1 on a next input detection signal of the current of the electric power system.

In operation ST2 of FIG. 3, the controller 10d compares a rate of change provided from the differentiator 10c with a reference rate of change which has been previously set and stored.

According to the comparison result in operation ST2 of FIG. 3, when the rate of change provided from the differentiator 10c is greater than or equal to the reference rate of change which has been previously set and stored, operation ST4 is performed, and when the rate of change provided from the differentiator 10c is smaller than the reference rate of change which has been previously set and stored, operation ST3 is performed.

When the detection signal of the current of the electric power system has a waveform identical to the waveform S3, it means that the rate of change provided from the differentiator 10c is smaller than the reference rate of change which has been previously set and stored, and thus, the process is returned to operation ST3 in which the controller 10d compares the magnitude of the frequency component of the current of the electric power system provided from the DFT circuit section 10b with a previously set and stored trip reference value.

According to the comparison result in operation ST3 of FIG. 3, when the magnitude of the frequency component of the current of the electric power system provided from the DFT circuit section 10b is greater than or equal to the previously set and stored trip reference value, operation ST5 is performed, and when the magnitude of the frequency component of the current of the electric power system provided from the DFT circuit section 10b is smaller than the previously set and stored trip reference value, the process is returned to operation ST1.

When the magnitude of the frequency component of the current of the electric power system provided from the DFT circuit section 10b is greater than or equal to the previously set and stored trip reference value, the controller 10d generates and outputs a trip control signal to a trip coil of a trip mechanism of a circuit breaker (not shown) to magnetize the trip coil, thus allowing the trip mechanism to trigger a switching mechanism to move the switching device to a trip position, whereby a movable contact is separated from a corresponding fixed contact by a trip spring of the switching mechanism, performing a trip operation to break the circuit, and since the circuit of the electric power system is broken, it is protected from a fault current.

Hereinafter, an operation of the control circuit for an electric power circuit switch according to a preferred embodiment of the present invention when the detection signal of the current of the electric power system provided from the current transformer 1 has a waveform identical to the waveform S2 or S1 will be described.

Referring to FIG. 3, in operation ST1, the controller 10d compares a current value of the detection signal of the current of the electric power system provided from the current transformer 1 with the upper limit reference current value $i_{limit}$ which has been previously set and stored, according to a processing program to check whether the former is greater than or equal to the latter.

According to the comparison result in operation ST1, when the current value of the detection signal of the current of the electric power system is greater than or equal to the upper limit reference current value $i_{limit}$ which has been previously set and stored, the controller 10d performs operation ST2 according to the processing program, and when the current value of the detection signal of the current of the electric power system is smaller than the upper limit reference current value ilimit which has been previously set and stored, the controller 10d performs operation ST1 on a next input detection signal of the current of the electric power system.

In operation ST2 of FIG. 3, the controller 10d compares a rate of change provided from the differentiator 10c with a reference rate of change which has been previously set and stored.

According to the comparison in operation ST2 of FIG. 3, when the detection signal of the current of the electric power system has the waveform S3, it means that the rate of change provided from the differentiator 10c is greater than the previously set and stored reference rate of change, and thus, operation ST4 is performed.

In operation ST4, when the calculated rate of change is greater than or equal to the previously set and stored reference rate of change, it means that the detected current of the electric power system is a large current such as a short current, so the controller 10d generates and outputs a trip control signal to a trip coil of a trip mechanism of a circuit breaker (not shown) to magnetize the trip coil, thus allowing the trip mechanism to trigger a switching mechanism to move to a trip position, whereby a movable contact is separated from a corresponding fixed contact by a trip spring of the switching mechanism, performing a trip operation to break the circuit, and since the circuit of the electric power system is broken, it is protected from a fault current.

As described above, the control circuit 10 for an electric power circuit switch according to a preferred embodiment of the present invention has the following advantages. That is, on the basis of a rate of change of the current of the electric power system and the reference rate of change, when the rate of change is greater than or equal to the reference rate of change, the control circuit 10 determines that the current of the electric power system is a large current as a fault current such as a short-circuit current, and outputs a trip control signal to the circuit breaker, and when the rate of change is smaller than the reference rate of change, the control circuit 10 determines whether to perform trip controlling on the basis of a magnitude of a frequency component of the current of the electric power system output from the DFT circuit section. Thus, over a small fault current, the control circuit 10 may determine that the fault current gas been generated through DFT requiring a time equal to or more than one period, and over a large fault current such as a short-circuit current, the control circuit 10 may determine that the fault current has been generated quickly (or at a high speed) within a time shorter than one period, and generate and output a trip control signal to a switch.

In the control circuit for an electric power circuit switch, when a value of an current of the electric power system according to a detection signal of the current of the electric power system exceeds a rated current value, the controller compares a rate of change from the differentiator with a predetermined reference rate of change. When the rate of change is smaller than the reference rate of change, the controller may determine whether to perform trip controlling on the basis of a magnitude of a frequency component of an current of the electric power system provided from the DFT circuit section, and when the rate of change is equal to or greater than the reference rate of change, the controller determines whether to perform trip controlling on the basis of the rate of change from the differentiator. Therefore, when a fault current exceeding the rated current value is generated in the electric power system, the controller can select a response speed according to the rate of change of the fault current and control the switch.

The control circuit for an electric power circuit switch according to a preferred embodiment of the present invention provides a detection signal of an current of the electric power system and includes the sampling/hold circuit section, the differentiator, and the current transformer connected to the controller. Thus, the control circuit can provide one-period data according to a detection of the current of the electric power system by the sampling/hold circuit section, provide a rate of change of the current of the electric power system by the differentiator, and determine whether to generate and output a trip control signal according to comparison with a predetermined rated current value by the controller.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and rate of changes will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A control circuit for an electric power circuit switch, the control circuit comprising:
a sampling/hold circuit section configured to sample a period of a detection signal of a current of an electric power system and provide a sampled signal;
a discrete Fourier transforming circuit section connected to the sampling/hold circuit section and perform a discrete Fourier transforming on the one-period sampled signal of the current of the electric power system provided from the sampling/hold circuit section to provide a magnitude and a phase of a frequency component of the current of the electric power system;
a differentiator configured to differentiate the detection signal of the current of the electric power system to provide a rate of change of the current of the electric power system over time; and
a controller connected to the discrete Fourier transforming circuit section and the differentiator and configured to determine whether to perform trip controlling according to the magnitude of the frequency component of the current of the electric power system from the discrete Fourier transforming circuit section or the rate of change from the differentiator on the basis of the rate of change of the current of the electric power system and the reference rate of change.

2. The control circuit of claim 1, wherein
when a value of the current of the electric power system according to the detection signal of the current of the electric power system exceeds a rated current value, the controller is configured to compare the rate of change from the differentiator with a predetermined reference rate of change, and when the rate of change is smaller than the reference rate of change, the controller determines whether to perform trip controlling on the basis of the magnitude of the frequency component of the current of the electric power system provided from the discrete Fourier transforming circuit section.

3. The control circuit of claim 1, wherein
when a value of the current of the electric power system according to the detection signal of the current of the electric power system exceeds a rated current value, the controller is configured to compare the rate of change from the differentiator with a predetermined reference rate of change, and when the rate of change is equal to or greater than the reference rate of change, the controller determines whether to perform trip controlling on the basis of the rate of change from the differentiator.

4. The control circuit of claim 1, further comprising a current transformer configured to provide the detection signal of the current of the electric power system and connected to the sampling/hold circuit section, the differentiator, and the controller.

* * * * *